US010263876B2

(12) United States Patent
Kraev (10) Patent No.: US 10,263,876 B2
(45) Date of Patent: *Apr. 16, 2019

(54) ADAPTIVE SERVICE TIMEOUTS (71) Applicant: Amazon Technologies, Inc., Seattle, WA (US)

(72) Inventor: Kaloyan K. Kraev, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/075,898

(22) Filed: Mar. 21, 2016

(65) Prior Publication Data

US 2016/0205010 A1    Jul. 14, 2016

Related U.S. Application Data (63) Continuation of application No. 13/622,094, filed on Sep. 18, 2012, now Pat. No. 9,292,039.

(51) Int. Cl.
G06F 1/14 (2006.01)
H04L 12/26 (2006.01)
G06F 9/50 (2006.01)

(52) U.S. Cl.
CPC ............ H04L 43/16 (2013.01); G06F 1/14 (2013.01); G06F 9/5022 (2013.01); H04L 43/024 (2013.01); H04L 43/106 (2013.01); G06F 2209/504 (2013.01); Y02D 10/22 (2018.01)

(58) Field of Classification Search
CPC ........................................................ G06F 1/14
See application file for complete search history.

(56) References Cited

U.S. PATENT DOCUMENTS

| 5,384,770 A | 1/1995 | Mays et al. |
| 6,526,433 B1 | 2/2003 | Chang et al. |
| 7,953,870 B1 | 5/2011 | Reeves et al. |
| 8,214,492 B2 | 7/2012 | Chauvin et al. |
| 2001/0029544 A1 | 10/2001 | Cousins |
| 2004/0078685 A1 | 4/2004 | Glass |
| 2004/0153263 A1 | 8/2004 | Holle |
| 2005/0268136 A1 | 12/2005 | Kostadinov et al. |
| 2009/0320030 A1 | 12/2009 | Ogasawara |
| 2010/0014541 A1 | 1/2010 | Harriman |
| 2010/0211959 A1 | 8/2010 | Chan et al. |

(Continued)

FOREIGN PATENT DOCUMENTS

| CN | 101630301 A | 1/2010 |
| CN | 101727648 A | 6/2010 |

(Continued)

OTHER PUBLICATIONS

First Office Action for CN 201380048608.5 dated Jun. 30, 2016.

(Continued)

*Primary Examiner* — Kim Huynh
*Assistant Examiner* — Eric Chang
(74) *Attorney, Agent, or Firm* — Thomas | Horstemeyer, LLP (57) ABSTRACT Disclosed are various embodiments for a timeout management application. Latency data for executing services is obtained. The used service capacity is calculated. If the service capacity is outside of a predefined range, the timeout of a selected service is reconfigured.

20 Claims, 4 Drawing Sheets (56) References Cited

U.S. PATENT DOCUMENTS

| 2010/0257525 | A1 | 10/2010 | Yin et al. |
| 2010/0329127 | A1 | 12/2010 | Pirozzi |
| 2014/0013137 | A1* | 1/2014 | Wilson ............... G06F 1/00 713/323 |

FOREIGN PATENT DOCUMENTS

| JP | 2001350639 | 12/2001 |
| JP | 2006279531 A | 10/2006 |
| RU | 2454820 | 6/2012 |

OTHER PUBLICATIONS

English Translation of First Office Action for CN 201380048608.5 dated Jun. 30, 2016.
English Translation of CN 101630301 published on Jan. 20, 2010.
English Translation of CN 101727648 published on Jun. 9, 2010.
European Search Report dated Apr. 25, 2016 in corresponding European Patent Application No. 13839880.5 filed Mar. 4, 2015.
Second Office Action for CN 201380048608.5 dated Mar. 7, 2017.
Boteanu, D., et al.,"Queue Management as a DoS Counter-Measure?", Information Security, Springer Berlin-Heidelberg, 2007, pp. 263-280, sections 1, 2, 3.1, and 3.2.
International Search Report dated Apr. 4, 2014 in corresponding International Application No. PCT/US13/60080 filed Sep. 17, 2013.
Singapore Search Report dated Aug. 14, 2015 in corresponding Singapore Application No. 11201502058Q filed Sep. 17, 2013.
Japanese Office Action dated Jan. 5, 2016 in corresponding Japanese Patent Application No. 2015-533130 filed Mar. 18, 2015.
Australian Government Examination Report for AU application No. 2016238862 dated Jul. 28, 2017.
European Office Action for Application No. 13 839 880.5-1221 dated May 2, 2018.
U.S. Appl. No. 13/622,094, filed Sep. 18, 2012, Non-Final Office Action dated Mar. 17, 2015.
U.S. Appl. No. 13/622,094, filed Sep. 18, 2012, Notice of Allowance dated Nov. 18, 2015.
U.S. Appl. No. 13/622,094, filed Sep. 18, 2012, Response to Non-Final Office Action dated Mar. 17, 2015.
Australian Patent Application AU2013318299 filed on Sep. 17, 2013, Examination Report dated Oct. 9, 2015.
Australian Patent Application AU2013318299 filed on Sep. 17, 2013, Examination Report dated May 24, 2016.
Australian Patent Application AU2013318299 filed on Sep. 17, 2013, Examination Report dated Sep. 30, 2016.
Canadian Patent Application CA2,881,153 filed on Sep. 17, 2013, Office Action dated Mar. 23, 2016.
Canadian Patent Application CA2,881,153 filed on Sep. 17, 2013, Office Action dated Mar. 14, 2017.
Canadian Patent Application CA2,881,153 filed on Sep. 17, 2013, Office Action dated Feb. 20, 2018.
Russian Patent Application RU2015114547 filed Sep. 17, 2013, Office Action dated Jul. 20, 2016.
Singapore Patent Application SG11201502058Q filed on Sep. 17, 2013, Intent to Grant/Final Examination Report dated May 3, 2016.
Australian Patent Application AU2016238862 filed Sep. 17, 2013, Notice of Allowance dated Oct. 17, 2017.

* cited by examiner

ADAPTIVE SERVICE TIMEOUTS

CROSS-REFERENCE TO RELATED APPLICATIONS

This application is a continuation of and claims priority to U.S. application Ser. No. 13/622,094 titled "ADAPTIVE SEARCH TIMEOUTS", filed Sep. 18, 2012, which is incorporated herein by reference in its entirety.

BACKGROUND

Timeouts can prevent excessive use of system resources in processing high-latency service calls. Specifically, when processes time out, they no longer consume system resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Service-oriented architectures enforce timeouts to prevent excessive use of system resources when making calls to a high-latency service. This prevents a high-latency service from monopolizing or abusing system resources to resolve its calls at the expense of other services competing for the same system resources. Timeouts are often preset values, defined with respect to the executed service and the service which called upon the executed service. This precludes adapting the timeout values to various system states. For example, in periods of low overall system use, timeouts for services could be increased. This would allow the services more time to access system resources to resolve their calls. This also reduces the number of service call failures without affecting other services. As another example, in periods of high system resource usage, timeouts for high-latency services could be decreased. This would result in more failures for that service, but would allow the other services to complete their service calls.

According to various embodiments, a timeout management application allows the timeouts of services to be redefined in order to adapt to the state of the environment in which they are implemented. Timeouts can be increased or decreased based on service latency and the amount of system resources in use. The timeout management application can also take into account service dependencies when modifying timeout values. For example, a parent service may call several child services, and both the parent and child services have their own timeouts. The child or parent service timeouts can be modified to ensure the timeouts meet predefined criteria with respect to each other. These dependencies can also affect which services are modified so as to adapt to the amount of system usage. The timeout management application may enforce a preference for modifying independent services, to minimize the number of affected services. In another example, the timeout management application may want to modify timeouts of services upon which many other services depend to ensure maximum service availability.

Additionally, the adaptive ability of a timeout management application can take into account various tiers or priorities associated with the services to ensure that high priority or tier services have maximized availability. In the following discussion, a general description of the system and its components is provided, followed by a discussion of the operation of the same.

Figure 1:
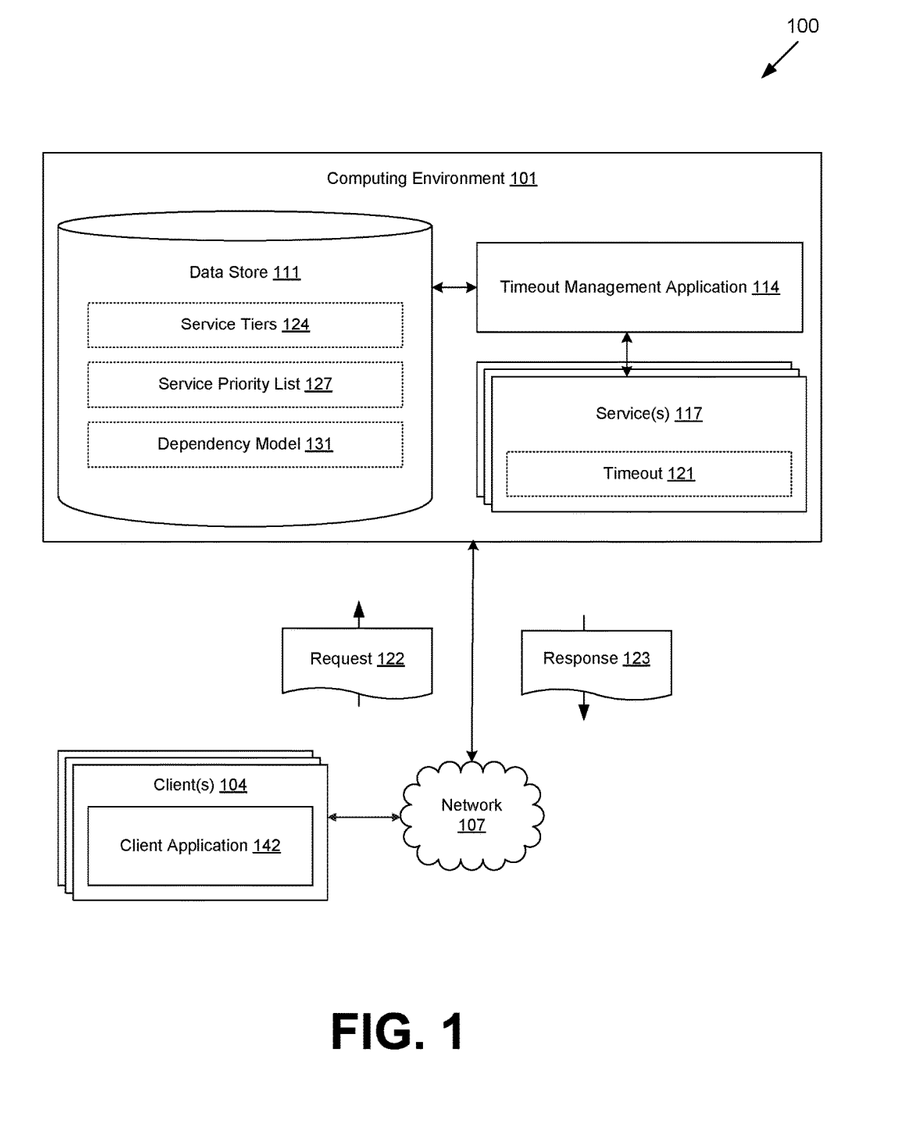
FIG. 1 is a drawing of a networked environment according to various embodiments of the present disclosure.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111 for example, is associated with the operation of the various applications and/or functional entities described below.

The components executed on the computing environment 101, for example, include a timeout management application 114, a plurality of services 117, and other applications, services, processes, systems, engines, or functionality not discussed in detail herein. The timeout management application 114 is executed to modify the timeouts 121 corresponding to the respective pairs of the executed services 117 based on the state of the computing environment 101.

Services 117 comprise functionality that, in response to a call, perform some action or return some data. Services 117 may comprise functionality to serve network pages, read data from or store data in a data store, perform data transformations, communicate with other applications, manage network traffic, or some other functionality. Services 117 may be embodied in a representational state transfer (RESTful) architecture, or some other architecture. A service 117 may require the execution of one or more child services 117 to complete a call to the service 117. Services 117 may be executed and called to facilitate the handling of requests 122 sent by a client 104 to generate a response 123, or for other purposes.

Each of the services 117 executed in the computing environment 101 is associated with at least one timeout 121. A called service 117 may have many timeouts 121, each corresponding to a different service 117 which calls the called service 117. The timeout 121 defines a maximum threshold of time to complete a call to the service 117. If the service 117 fails to complete a call within the timeout 121, the service 117 returns an error to the source of the call.

Each of the services 117 also corresponds to a latency indicative of the time it takes to complete a call to the corresponding one of the services 117. The latency may be affected by the amount of used system resources in the computing environment 101 relative to the total capacity of system resources. For example, the computing environment 101 may have a high amount of used system resources when handling many service 117 calls, or when the services 117 called are computationally expensive, resulting in an increased latency in some services 117.

The data stored in the data store 111 includes, for example, data embodying service tiers 124, a service priority list 127, a dependency model 131, and potentially other data. The service tiers 124 represent a grouping of the executed services 117 into one or more groupings. The groupings may be mutually exclusive or allow for a service 117 to belong to multiple groups. The groupings may be themselves ranked or ordered in some hierarchy. The groupings may also be based on some qualitative assessment of the included services 117, such as by priority.

The service priority list 127 embodies a ranking of the executed services 117 based on their priority of availability. The service priority list 127 may comprise the entirety of the executed services 117 or a subset thereof. Multiple service priority lists 127 may be stored for retrieval as a function of one or more predefined conditions.

The dependency model 131 embodies relationships and dependencies between the executed services 117. The structure of the dependency model 131 may embody a tree, some other acyclical directed graph, or another data structure. Nodes in the dependency model 131 representing services 117 may be related to parent or child nodes as a function of a service 117 calling other services 117 during execution. The dependency model 131 may embody a completely connected graph, or may allow independent nodes.

The client 104 is representative of a plurality of client devices that may be coupled to the network 107 The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 142 and/or other applications. The client application 142 may be executed in a client 104 for example, to access network content served up by the computing environment 101 and/or other servers. The client application 142 may, for example, correspond to a browser, a mobile application, etc. The client 104 may be configured to execute applications beyond the client application 142 such as, for example, browsers, mobile applications, email applications, social networking applications, and/or other applications.

The client 104 may communicate requests 122 to the computing environment 101 to obtain responses 123. These requests 122 may comprise requests for network pages to be served by the computing environment 101, requests for data, requests for some function or application to be executed on the computing environment 101, or another type of request. The request may be communicated by hyptertext transfer protocol (HTTP), file transfer protocol (FTP), simple object access protocol (SOAP), simple mail transfer protocol (SMTP), by another protocol, or by some other approach. Communicating the requests 122 may be facilitated by the client application 142. For example, a request 122 for a network page may be facilitated by a browser client application 142. Other client applications 142 may also be executed to facilitate the communication of requests 122 to the computing environment 101.

Next, a general description of the operation of the various components of the networked environment 100 is provided. To begin, the computing environment 101 executes one or more services 117 in order to facilitate the handling of the requests 122 communicated by the client 104 and the generation of the responses 123. The timeout management application 114 obtains latency information corresponding to each of the executed services 117. In some embodiments, latency data may be obtained from a monitoring process. For example, services 117 may report latency data to a log accessible to the monitoring process, which then aggregates the data for communication to the timeout management application 114. The services 117 may communicate latency data to the logs at a predefined interval, or in response to some event. The latency data may comprise the most recent latency at the time of communication to the logs, or latency data aggregated over a period of time. Latency data may also be communicated to the logs by another approach.

In another embodiment, latency data may be obtained by querying functionality of the service 117. For example, a service 117 may comprise functionality to maintain latency data and functionality to return that latency data in response to a specified call to the service 117. Latency data may also be obtained by determining the latency as a function of data from entities which called the service 117. Other techniques may also be used to obtain the latency data by the timeout management application 114.

The timeout management application 114 then determines the amount of system resources used in the computing environment 101 relative to the total capacity of the computing environment 101. The amount of system resources may be determined as a function of the obtained latency data, as well as other data, information, and logs. The timeout management application 114 may then adjust the timeout 121 of a selected service in response to an event associated with the amount of used system resources.

In some embodiments, the timeout management application 114 may adjust a timeout 121 of a service 117 when the amount of system resources used in the computing environment 101 falls below a predetermined threshold or below a minimum value of a predefined range. In these embodiments, such a condition would indicate that the computing environment 101 has processing capacity available to allow for a service 117 to have its timeout increased.

In other embodiments, the timeout management application 114 may adjust a timeout 121 of a service 117 when the amount of system resources used in the computing environment 101 exceeds a predetermined threshold or above a maximum value of a predefined range. In these embodiments, such a condition would indicate that the computing environment 101 is at or is approaching capacity, at which the executed services 117 may experience latencies which exceed their timeouts 121, thereby resulting in increased user failure. Decreasing the timeout 121 of a selected service 117 would increase failure for the selected service 117, but allow other services 117 to capitalize on available system resources of the computing environment 101.

The timeout management application 114 may also adjust a timeout 121 of a service 117 as a function of system reliability. For example, the timeout management application 114 may determine an amount of system reliability based on the number of service 117 calls which successfully execute, and/or other data. A timeout 121 modification may be triggered if the system reliability falls below a predetermined reliability threshold. Other events may also trigger a timeout 121 modification by the timeout management application 114.

When an event occurs that triggers a timeout 121 modification by the timeout management application 114, the timeout management application 114 must select a service 117 whose timeout 121 will be modified. In some embodiments, this selection made as a function of service tiers 124 associated with the executed services 117. As a non-limiting example, services 117 may be organized into multiple tiers such as high priority, medium priority, and low priority service tiers 124 depending on the priority of the service 117 completing a call without error. If the timeout management application 114 is modifying the timeout 121 of a service 117 due to high available service capacity, the timeout management application 114 may select a service 117 belonging to the high priority service tier 124 to maximize the availability of the high priority service 117. If the timeout management application 114 is modifying the timeout 121 of a service 117 due to low available service capacity, the timeout management application 114 may select a service 117 belonging to the low or medium priority service tiers 124 to minimize impact on high priority services 117. Service tiers 124 may be used in other techniques to select a service 117 for timeout 121 modification, as well.

The timeout management application 114 may also select a service 117 for timeout 121 modification based at least in part on a service priority list 127. The service priority list 127 may contain a ranked or ordered list of the executed services 117, and the selection of a service 117 is based on their placement on the service priority list 127. The timeout management application 114 may refer to a single service priority list 127 or multiple service priority lists 127. For example, in embodiments in which multiple events can trigger a modification of a service 117 timeout 121, the timeout management application 114 may consult one or more of a plurality of service priority lists 127 depending on the event. Service priority lists 127 may also be used in other techniques to select a service 117 for timeout 121 modification.

The timeout management application 114 may select a service 117 for timeout 121 modification based at least in part on a dependency model 131. For example, in embodiments in which the dependency model 131 comprises independent services 117, the timeout management application 114 may preferentially modify the timeout 121 of independent services 117 to minimize the impact on other executed services 117. In another embodiment in which a timeout 121 is to be increased, the timeout management application 114 may preferentially modify the timeout 121 of a service 117 which is depended on by multiple services 117 to maximize the availability of more services 117.

In embodiments in which the timeout management application 114 selects a service 117 for timeout 121 modification based at least in part on a dependency model 131, the timeout management application 114 may recursively select further services 117 for timeout 121 modification. For example, if a child service 117 has its timeout 121 increased, then the timeout management application 114 may then recursively increase the timeouts 121 of the parent services 117. As another example, if a parent service 117 has its timeout 121 decreased, the timeout management application 114 may then recursively decrease the timeouts 121 of the child services 117.

The timeout management application 114 may also select a service 117 for timeout 121 modification based on the latency or amount of used resources associated with the execution of the service 117. For example, a high latency service 117 may have its timeout increased to decrease the chance of a service 117 call failure. As another example, a high latency service 117 may have its timeout decreased to increase failure of its calls, but also free a greater amount of the service capacity for other services 117. Latency or the amount of used resources associated with the execution of the service 117 may be used in other approach, as well.

The previously discussed examples of techniques to select a service 117 for timeout 121 modification are non-limiting examples, and other techniques may also be used to select a service 117 for timeout 121 modification. Additionally, any of the previously discussed techniques as well as other techniques may be used alone or in combination with one another. For example, services 117 may be organized into service tiers 124, which are ranked within each service tier 124 according to a service priority list 127. Other combinations of techniques may also be used.

Once a service 117 has been selected for timeout 121 modification, the timeout management application 114 assigns the service 117 a new timeout 121. The new timeout 121 may be a function of the timeout 121 to be modified. For example, the new timeout 121 may comprise a percentage of the original timeout 121. The new timeout 121 may also comprise the original timeout 121 incremented or decremented by a predetermined interval. In embodiments employing service tiers 124, the new timeout 121 may be based on the service tier 124 to which the service 117 belongs. For example, a service 117 in a high priority service tier 124 may be assigned a new timeout 121 that is five seconds greater than the original timeout 121, while a service 117 of a medium service tier 124 may be assigned a new timeout 121 that is three seconds greater than the original timeout 121. Service tiers 124 may also be used in another approach to assign the new timeout 121.

In embodiments in which the services 117 are related using a dependency model 131, the new timeout 121 may be a function of the timeouts corresponding to parent or child services 117. As a non-limiting example, a new timeout 121 may comprise some amount greater than the summation of the timeouts of child services 117. As another example, a new timeout 121 may comprise some amount that is less than the timeout 121 of the associated parent services 117. Other functions may also be used to set parent and child timeouts with respect to each other.

Additionally, the new timeout 121 value may be a function of maximum or minimum acceptable timeouts 121. For example, a timeout 121 may not be set below some minimum threshold. If the selected service 117 timeout 121 is already at that minimum threshold, then the timeout management application 114 may select a different service 117. Minimum and maximum timeout 121 thresholds may comprise single thresholds applied to all services 117, or may comprise thresholds that vary depending on the associated service 117. Other approaches may be used to determine a new timeout 121 based at least in part on the dependency model 131.

After the timeout management application 114 has assigned a new timeout 121 to the selected service 117, the timeout management application 114 continues to monitor the latency data of the executed service 117. Though the previously operations of the timeout management application 114 were discussed in the context of selecting a single service 117 for timeout 121 modification, the timeout management application 114 may also select multiple services 117 for timeout 121 modification in response to an event in some embodiments.

The timeout management application 114 may repeatedly select services 117 and modify their timeouts 121 as a function of the state of the computing environment 101, such as until the amount of used system resources is within a predefined range, or by another approach.

Figure 2:
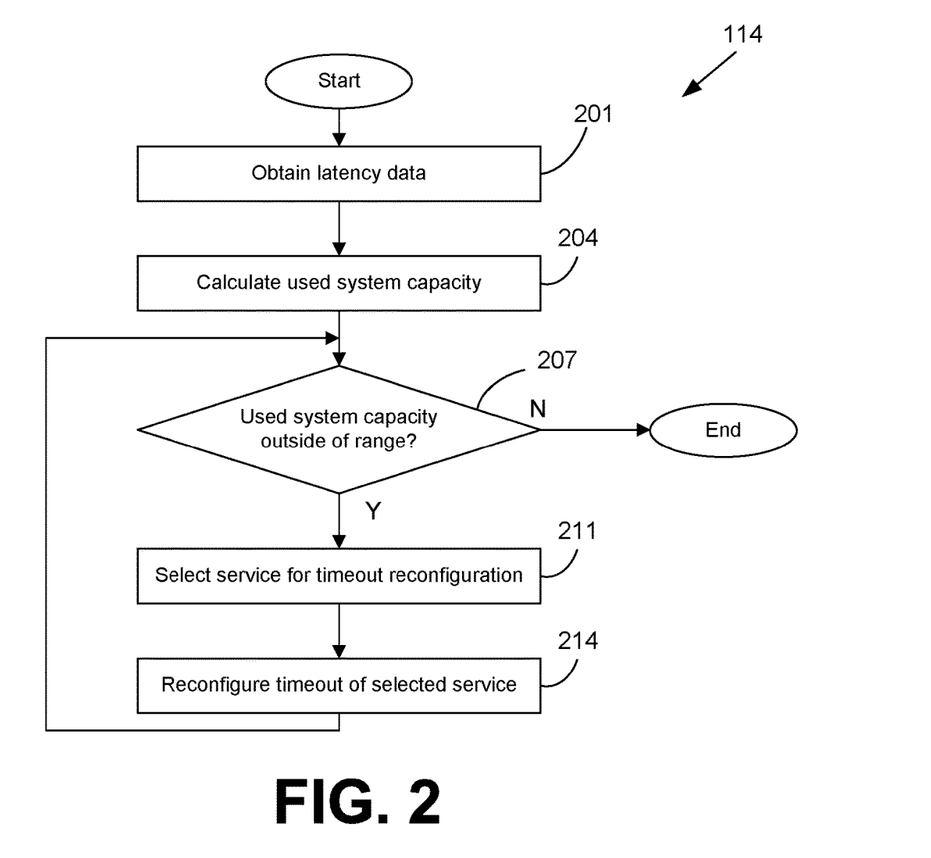
FIG. 2 is a flowchart illustrating one example of functionality implemented as portions of the timeout management application executed in a computing environment in the networked environment of FIG. 1 according to various embodiments of the present disclosure.

Referring next to FIG. 2, shown is a flowchart that provides one example of the operation of a portion of the timeout management application 114 (FIG. 1) according to various embodiments. It is understood that the flowchart of FIG. 2 provides merely an example of the many different types of functional arrangements that may be employed to implement the operation of the portion of the timeout management application 114 as described herein. As an alternative, the flowchart of FIG. 2 may be viewed as depicting an example of steps of a method implemented in the computing environment 101 (FIG. 1) according to one or more embodiments.

FIG. 2 shows an example embodiment of the timeout management application 114 reconfiguring the timeouts 121 (FIG. 1) of executed services 117 (FIG. 1) while the amount of used service capacity is outside of a predefined acceptable range. Services 117 are iteratively selected and their timeouts 121 modified until the used service capacity is within the predefined range.

Beginning with box 201, the timeout management application 114 obtains latency data associated with at least one service 117 executed in the computing environment 101. In some embodiments, the executed services 117 update log files with data associated with their latencies. The data may comprise the latency at the instance that the log file is updated, an aggregate function of latency over a predefined time period, or other data. In other embodiments, the timeout management application 114 may directly query functionality of the executed services 117 which returns latency data. Other approaches may also be used to obtain the latency data.

Next, in box 204, the timeout management application 114 calculates an amount of used service capacity of the computing environment 101. The amount of used service capacity may correspond to the entirety of the computing environment 101 or a designated subcomponent or set of subcomponents. The amount of used service capacity may be calculated as a function of the obtained latency data, data obtained from another monitoring or profiling service, or other data as can be appreciated.

In box 207, the timeout management application 114 determines if the amount of used service capacity is outside of a predefined range. The predefined range may be a function of the total available service capacity or other data, or may be a preset independent value. If the amount of used service capacity is inside of the predefined range, the process ends, indicating that the computing environment 101 is operating within acceptable capacity and the timeouts 121 of the services 117 do not need to be adjusted.

If the amount of used service capacity is outside of the predefined range, the process moves to box 211 wherein the timeout management application 114 selects a service 117 for timeout 121 reconfiguration. In some embodiments, the services 117 are associated with at least one service tier 124 (FIG. 1). In such embodiments, the selection may be made as a function of the service tiers 124. For example, if the amount of used service capacity was below the minimum value of the predefined range, the timeout management application 114 may select a service 117 in a high priority service tier 124 to have their timeout 121 increased so as to allocate to it more service capacity. As another example, if the amount of used service capacity was above the maximum value of the predefined range, the timeout management application 114 may select a service 117 in a low priority service tier 124 to have their timeout 121 decreased so as to reduce the capacity used by lower priority services 117. Service tiers 124 may also be used in other techniques to select a service 117.

In embodiments in which the services 117 are ranked in at least one service priority list 127, the selection by the timeout management application 114 may be made as a function of the service priority list 127. For example, if the amount of used service capacity was above the maximum value of the predefined range, the timeout management application 114 may select a service 117 ranked lower on the service priority list 127 for modification to minimize the effects on higher priority services 117. If the amount of used service capacity was below the minimum value of the predefined range, the timeout management application 114 may select a service 117 ranked higher on the service priority list 127 to maintain reliability of those high priority services 117. Service priority lists 127 may be used in selecting a service 117 for timeout 121 modification in another approach.

In embodiments in which the services 117 are related by a dependency model 131 (FIG. 1), the selection may be a function of the dependency model. For example, if the amount of used service capacity is below the minimum value of the predefined threshold, the timeout management application 114 may select a service 117 which is depended on by other services 117 to improve the reliability of the dependent services 117. As another example, if the amount of used service capacity is above the maximum value of the predefined threshold, the timeout management application 114 may select a service 117 which is independent of other services to have their timeout 121 reduced, minimizing the effect on other services 117. Dependency models 131 may be used to select services 117 for timeout 121 modification in other approaches, as well.

The selection of a service 117 may also be based on the latency data. For example, a high latency service 117 may be selected to have its timeout 121 reduced to prevent overuse of service capacity by the high latency service 117. The selection of a service 117 may also be based on maximum or minimum timeout 121 thresholds. For example, the timeout management application 114 would not select a service 117 to have its timeout 121 reduced when the timeout 121 already equals a minimum timeout 121 threshold. Other data, functions, and techniques may also be used to select the service 117.

After the service 117 has been selected, the timeout 121 of the selected service 117 is reconfigured in box 214. The new timeout 121 value may be a function of the amount of used service capacity. For example, if the amount of used service capacity is above the maximum value of the predefined threshold, the new timeout 121 value may be less than the original timeout 121 value. In embodiments in which the services 117 are related by a dependency model 131, the new timeout 121 value may be a function of the timeout 121 values of the related services 117. For example, if the selected service 117 is having their timeout 121 decreased, the new timeout 121 value may not be set below the sum or some other function of the timeouts 121 of services 117 upon which the selected service 117 depends. As another example, reconfiguring the timeout 121 of a service 117 may also require the iterative reconfiguration of timeouts 121 for services upon which the selected service 117 depends. Other approaches may also be used by the timeout management application 114 to determine the new timeout 121 value.

Once the timeout 121 of the selected service 117 has been reconfigured, the process repeats the steps of selecting services 117 and reconfiguring their timeouts 121 until the amount of used service capacity is within the predefined range.

Figure 3:
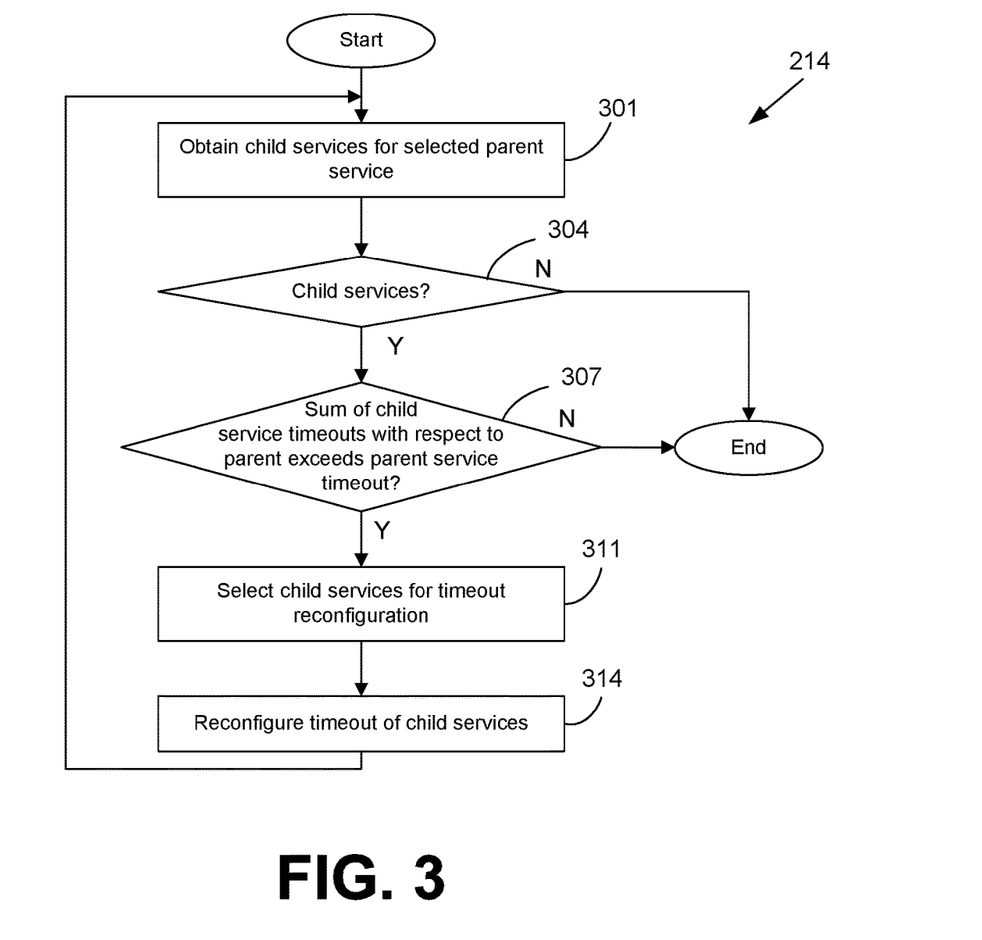
FIG. 3 is a flowchart illustrating one example of service dependency functionality implemented as portions of the timeout management application executed in a computing environment in the networked environment of FIG. 1 according to various embodiments of the present disclosure.

Referring next to FIG. 3, shown is a flowchart that provides one example of the iterative timeout 121 (FIG. 1) reconfiguration using a dependency model 131 (FIG. 1) of the timeout management application 114 (FIG. 1) of box 214 (FIG. 2) according to various embodiments. It is understood that the flowchart of FIG. 3 provides merely an example of the many different types of functional arrangements that may be employed to implement the operation of the portion of the timeout management application 114 as described herein. As an alternative, the flowchart of FIG. 3 may be viewed as depicting an example of steps of a method implemented in the computing environment 101 (FIG. 1) according to one or more embodiments.

FIG. 3 describes one embodiment of the timeout management application 114 implementing a dependency model 131. A selected service 117 (FIG. 1) whose timeout 121 has been modified may be related to several child services 117 upon which it depends. The timeouts 121 of a child service 117 should sum to be less than the timeout 121 of the parent service 117. The timeout management application 114 recursively traverses the dependency model 131 to modify the timeouts 121 of child services 117 to ensure that the sum of the child service 117 timeouts 121 is less than their parent service 117 timeout 121.

Beginning with box 301, after a parent service 117 has had their timeout 121 reconfigured to a lower value in box 211 (FIG. 2), the timeout management application 114 obtains the child services 117 for the selected parent service 117 using the dependency model 131. Obtaining child services 117 may be accomplished through a tree traversal algorithm, a graph search algorithm such as a breadth first search or depth first search, or by another approach.

In box 304, if the selected service 117 has no child services 117, the process ends. Otherwise, in box 307, the timeout management application 114 sums the timeouts 121 of the obtained child services 117. If the sum of the child service 117 timeouts 121 with respect to the selected service 117 is less than the timeout 121 of the selected service 117, then the process ends. Otherwise, if the sum of the timeouts 121 of the child services 117 exceeds the timeout 121 of the selected service 117, the timeouts 121 of at least one the child services 117 must be reconfigured.

In box 311, at least one of the child services 117 is selected for timeout 121 reconfiguration. In some embodiments, the entirety of the child services 117 may be selected. In other embodiments, a subset of the child services 117 may be selected. The selection may be a function of latency data associated with the child services 117 (FIG. 1), service tiers 124 (FIG. 1), a service priority list 127 (FIG. 1), the dependency model 131, minimum or maximum timeout thresholds or other data, by some technique described with respect to box 211 (FIG. 2) or by another approach.

In box 314, once the child services 117 have been selected, their corresponding timeouts 121 are reconfigured as described in box 214, or by another approach. After the child services 117 have been reconfigured, the process iterates for each of the reconfigured child services 117. The process will continue until all services 117 including and descending from the original selected service 117 have timeouts 121 greater than the sum of the timeouts 121 of their child services 117 or have no child services 117.

Figure 4:
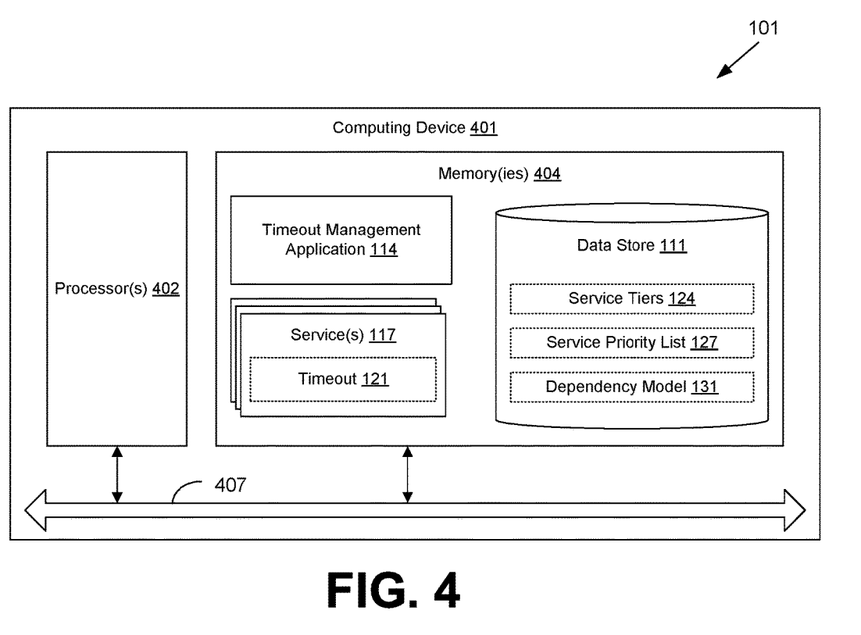
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a timeout management application 114 (FIG. 1), one or more services 117 (FIG. 1) having a corresponding timeout 121 (FIG. 1), and potentially other applications. Also stored in the memory 404 may be a data store 111 (FIG. 1) comprising service tiers 124 (FIG. 1), a service priority list 127 (FIG. 1) or a dependency model 131 (FIG. 1), and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the timeout management application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the timeout management application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the timeout management application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device configured to at least:
      monitor a first latency corresponding to a first service;
      monitor a second latency corresponding to a second service; and reconfigure a timeout associated with a pair of services including the first and second services based at least in part on the first and second latencies, the timeout defining a maximum time to complete a call to the first service of the pair of services when called by the second service of the pair of services.

2. The system of claim 1, wherein the at least one computing device is further configured to at least calculate an aggregate latency relative to a time interval based at least in part on the first latency and second lantency, and the timeout is further based at least in part on the aggregate latency.

3. The system of claim 1, wherein the at least one computing device is further configured to at least reconfigure the timeout further based at least in part on an amount of used service capacity.

4. The system of claim 3, wherein the at least one computing device is further configured to at least increase the timeout in response to the amount of used service capacity relative to a total service capacity falling below a threshold.

5. The system of claim 3, wherein the at least one computing device is further configured to at least decrease the timeout in response to the amount of used service capacity relative to a total service capacity exceeding a threshold.

6. The system of claim 3, wherein the at least one computing device is further configured to at least select the first service of the pair of services based at least in part on a subset of the amount of the service capacity used by the first service.

7. The system of claim 1, wherein the at least one computing device is further configured to at least select the first service of the pair of services based at least in part on a service priority list.

8. The system of claim 1, wherein the at least one computing device is further configured to at least select the first service of the pair of services based at least in part on a reliability threshold.

9. The system of claim 1, wherein the at least one computing device is further configured to at leas monitor the first and second latencies by obtaining log data from the first and second services.

10. A method, comprising:
monitoring, by at least one computing device, a first latency corresponding to a first service;
monitoring, by the at least one computing device, a second latency corresponding to a second service; and
reconfiguring, by the at least one computing device, a timeout associated with a pair of services including and first and second services based at least in part on the first and second latencies, the timeout defining a maximum time to complete a call to the first service of the pair of services when called by the second service of the pair of services.

11. The method of claim 10, further comprising calculating, by the at least one computing device, an aggregate latency relative to a time interval based at least in part on the first latency and the second latency, wherein the timeout is further based at least in part on the aggregate latency.

12. The method of claim 10, wherein the timeout is further based at least in part on an amount of used service capacity.

13. The method of claim 12, wherein the timeout is increased in response to the amount of used service capacity relative to a total service capacity falling below a threshold.

14. The method of claim 12, wherein the timeout is decreased in response to the amount of used service capacity relative to a total service capacity exceeding a threshold.

15. The method of claim 12, further comprising selecting, by the at least one computing device, the first service of the pair of services based at least in part on a subset of the amount of the service capacity used by the first service.

16. The method of claim 10, further comprising selecting, by the at least one computing device, the first service of the pair of services based at least in part on a service priority list, wherein the timeout is associated with the selected one of the services.

17. The method of claim 10, further comprising selecting, by the at least one computing device, the first service of the pair of services based at least in part on a reliability threshold.

18. A non-transitory computer-readable medium embodying a program executable in at least one computing device, the program, when executed, causing the at least one computing device to at least:
obtain a first set of information from a first service, the first set of information indicating at least first latency data associated with processing requests with the first service and a first current capacity of the first service; and
obtain a second set of information from a second service, the second set of information indicating second latency data associated with processing requests with the second service, and a second current capacity of the second service;
determine, for a time interval, a first timeout value for the first service based at least in part on the first set of information obtained and a second timeout value for the second service based at least in part on the second set of information obtained, the first timeout value for the first service defining a maximum time to complete a call to the first service when called by the second service; and
send, for the time interval, the first timeout value to the first service and the second timeout value to the second service, wherein the first service is configured to adjust a first timeout based at least in part on the first timeout value and the second service is configured to adjust a second timeout threshold based at least in part on the second timeout value.

19. The non-transitory computer-readable medium of claim 18, wherein the program further causes the at least one computing device to select the first service or the second service based at least in part on a reliability threshold.

20. The non-transitory computer-readable medium of claim 18, wherein at least one of the first timeout value or the second timeout value is based at least in part on an amount of used service capacity.

* * * * *